(12) United States Patent
Han et al.

(10) Patent No.: US 9,792,953 B2
(45) Date of Patent: Oct. 17, 2017

(54) MOBILE TERMINAL AND CONTROL METHOD FOR THE SAME

(71) Applicant: LG ELECTRONICS INC., Seoul (KR)

(72) Inventors: Jongwoo Han, Seoul (KR); Shounan An, Seoul (KR); Jungho Lee, Seoul (KR); Seungmin Baek, Seoul (KR)

(73) Assignee: LG ELECTRONICS INC., Seoul (JP)

( * ) Notice: Subject to any disclaimer, the term of this patent is extended or adjusted under 35 U.S.C. 154(b) by 16 days.

(21) Appl. No.: 15/006,998

(22) Filed: Jan. 26, 2016

(65) Prior Publication Data

US 2017/0025151 A1 Jan. 26, 2017

Related U.S. Application Data

(60) Provisional application No. 62/195,802, filed on Jul. 23, 2015.

(30) Foreign Application Priority Data

Aug. 31, 2015 (KR) .......................... 10-2015-0123232

(51) Int. Cl.
*G11B 27/00* (2006.01)
*G11B 27/031* (2006.01)
(Continued)

(52) U.S. Cl.
CPC .......... *G11B 27/031* (2013.01); *G06F 3/0482* (2013.01); *G06F 3/0484* (2013.01);
(Continued)

(58) Field of Classification Search
CPC ..... G11B 27/031; G11B 27/34; G06F 3/0482; G06F 3/0484; G06F 3/04842; G06F 3/0488; G06K 9/00751
(Continued)

(56) References Cited

U.S. PATENT DOCUMENTS 8,649,573 B1 2/2014 Darbari et al.
2003/0061612 A1\* 3/2003 Lee .................. G06F 17/30793
725/61

(Continued)

FOREIGN PATENT DOCUMENTS

KR 10-2003-0030304 4/2003
KR 10-0956739 5/2010
(Continued)

OTHER PUBLICATIONS

PCT International Application No. PCT/KR2016/002084, Notification of Transmittal of the International Search Report and the Written Opinion of the International Searching Authority, or Declaration dated Jun. 17, 2016, 11 pages.

(Continued)

*Primary Examiner* — Mishawn Hunter

(74) *Attorney, Agent, or Firm* — Lee, Hong, Degerman, Kang & Waimey

(57) ABSTRACT

Disclosed are a mobile terminal and a method for controlling the same. The mobile terminal includes: a memory capable of storing video data therein; a touch screen capable of receiving a touch input related to the video data; and a controller capable of reducing a play time or a capacity of the video data based on a preset reference, such that a summary of the video data is generated based on the touch input, wherein the preset reference is established based on a restriction condition of a social network service or an application for sharing the video data.

20 Claims, 16 Drawing Sheets

(51) Int. Cl.
*G06F 3/0482* (2013.01)
*G06F 3/0484* (2013.01)
*G06F 3/0488* (2013.01)
*G06K 9/00* (2006.01)
*G11B 27/34* (2006.01)

(52) U.S. Cl.
CPC ........ *G06F 3/0488* (2013.01); *G06F 3/04842* (2013.01); *G06F 3/04883* (2013.01); *G06K 9/00751* (2013.01); *G11B 27/34* (2013.01)

(58) Field of Classification Search
USPC ........................................................ 386/282
See application file for complete search history.

(56) References Cited

U.S. PATENT DOCUMENTS

| | | | | |
|---|---|---|---|---|
| 2010/0174993 | A1* | 7/2010 | Pennington | G06F 1/1616 715/738 |
| 2012/0324491 | A1* | 12/2012 | Bathiche | H04H 60/33 725/10 |
| 2013/0326575 | A1* | 12/2013 | Robillard | G11B 27/034 725/116 |
| 2013/0343729 | A1* | 12/2013 | Rav-Acha | G11B 27/28 386/285 |
| 2014/0274297 | A1* | 9/2014 | Lewis | A63F 13/00 463/20 |
| 2014/0313341 | A1* | 10/2014 | Stribling | H04L 67/02 348/157 |
| 2014/0376887 | A1* | 12/2014 | Tijssen | G11B 27/34 386/282 |
| 2015/0032554 | A1* | 1/2015 | Hayes | G06Q 30/0277 705/14.73 |
| 2015/0346961 | A1* | 12/2015 | Cui | G06F 9/445 715/838 |
| 2015/0373281 | A1* | 12/2015 | White | G06F 3/0482 348/660 |
| 2016/0225405 | A1* | 8/2016 | Matias | G11B 27/005 |

FOREIGN PATENT DOCUMENTS

| | | |
|---|---|---|
| KR | 10-2013-0082370 | 7/2013 |
| WO | 2015/105215 | 7/2015 |

OTHER PUBLICATIONS

Korean Intellectual Property Office Application Serial No. 10-2015-0123232, Office Action dated Jun. 8, 2016, 5 pages.

* cited by examiner

MOBILE TERMINAL AND CONTROL METHOD FOR THE SAME

CROSS-REFERENCE TO RELATED APPLICATION

Pursuant to 35 U.S.C. §119, this application claims the benefit of earlier filing date and right of priority to Korean Patent Application No. 10-2015-0123232, filed on Aug. 31, 2015, and also claims the benefit of U.S. Provisional Application No. 62/195,802, filed on Jul. 23, 2015, the contents of which are all hereby incorporated by reference herein in their entirety.

BACKGROUND OF THE INVENTION

1. Field of the Invention

The present invention relates to a mobile terminal, and more particularly, to a mobile terminal having a touch screen and capable of storing, transmitting and receiving multimedia data.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

Various attempts have been made to implement complicated functions in such a multimedia device by means of hardware or software.

In recent years, as a camera mounted in the mobile terminal becomes multifunctional and various types of media are provided to the mobile terminal, a user stores a large amount of moving images (videos) in the mobile terminal. Further, it is possible to upload multimedia data stored in the mobile terminal to a Social Network Service (SNS). Sharing multimedia data with others using a social network service is an important function of the mobile terminal.

However, the social network service allows data uploading under a specific condition in order to restrict indiscreet uploading of multimedia data. Accordingly, a method for easily editing multimedia data stored in a mobile terminal may be considered.

SUMMARY OF THE INVENTION

Therefore, an aspect of the detailed description is to provide a function to allow a user to upload multimedia data to a social network service more easily.

Another aspect of the detailed description is to provide a method for enhancing a user's convenience by providing a function to extract a summary from multimedia data.

To achieve these and other advantages and in accordance with the purpose of this specification, as embodied and broadly described herein, there is provided a mobile terminal, including: a memory capable of storing video data therein; a touch screen capable of receiving a touch input related to the video data; and a controller capable of reducing a play time or a capacity of the video data based on a preset reference, such that a summary of the video data is generated based on the touch input. The preset reference may be established based on a restriction condition of a social network service or an application for sharing the video data.

A single video or a plurality of videos captured by a user may be selected by a user's input, and the mobile terminal may analyze the original video selected by the user to summarize the original video automatically. The video may be summarized so as to satisfy preset references established on a plurality of social network services.

In an embodiment, the controller may extract intra-coded frames from the video data at preset time intervals, and may generate a summary of the video data based on the extracted frames.

In an embodiment, an image related to the video data may be output to the touch screen. The controller may execute a function related to play of the video data in response to a first touch input applied to the image, and may execute a function related to summarization of the video data in response to a second touch input different from the first touch input.

In an embodiment, the controller may generate a single summary using the video data and other video data, or may generate a plurality of summaries of the video data using only the video data.

In an embodiment, upon selection of a social network service for sharing the video data, the controller may detect a restriction condition of the selected social network service in order to establish the preset reference.

In an embodiment, when the summary is generated as a play time or a capacity of the video data is reduced based on the preset reference, the generated summary may be transmitted to the social network service.

In an embodiment, information related to the summary may be recorded in the video data, or information related to the video data may be recorded in the summary.

In an embodiment, the controller may recommend an application or a social network service suitable for the summary.

To achieve these and other advantages and in accordance with the purpose of this specification, as embodied and broadly described herein, there is also provided a mobile terminal, including: a memory configured to store therein video data; a touch screen configured to output an image related to the video data, and to receive a play command of the video data by sensing a touch input applied to the image; and a controller configured to generate a summary of the video data, by receiving a summarization command with respect to the video data using the image, and by editing the video data such that a play time or a capacity is reduced.

The present invention may have the following advantages.

Firstly, as multimedia data is summarized based on a restriction condition of a social network service, a summary satisfying a user's demand and a demand of the social network service may be generated.

Further, as a restriction condition of a selected social network service is detected, a different summary corresponding to each social network service may be generated.

Further, as multimedia data is automatically summarized when the multimedia data is uploaded, a user's convenience may be enhanced.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
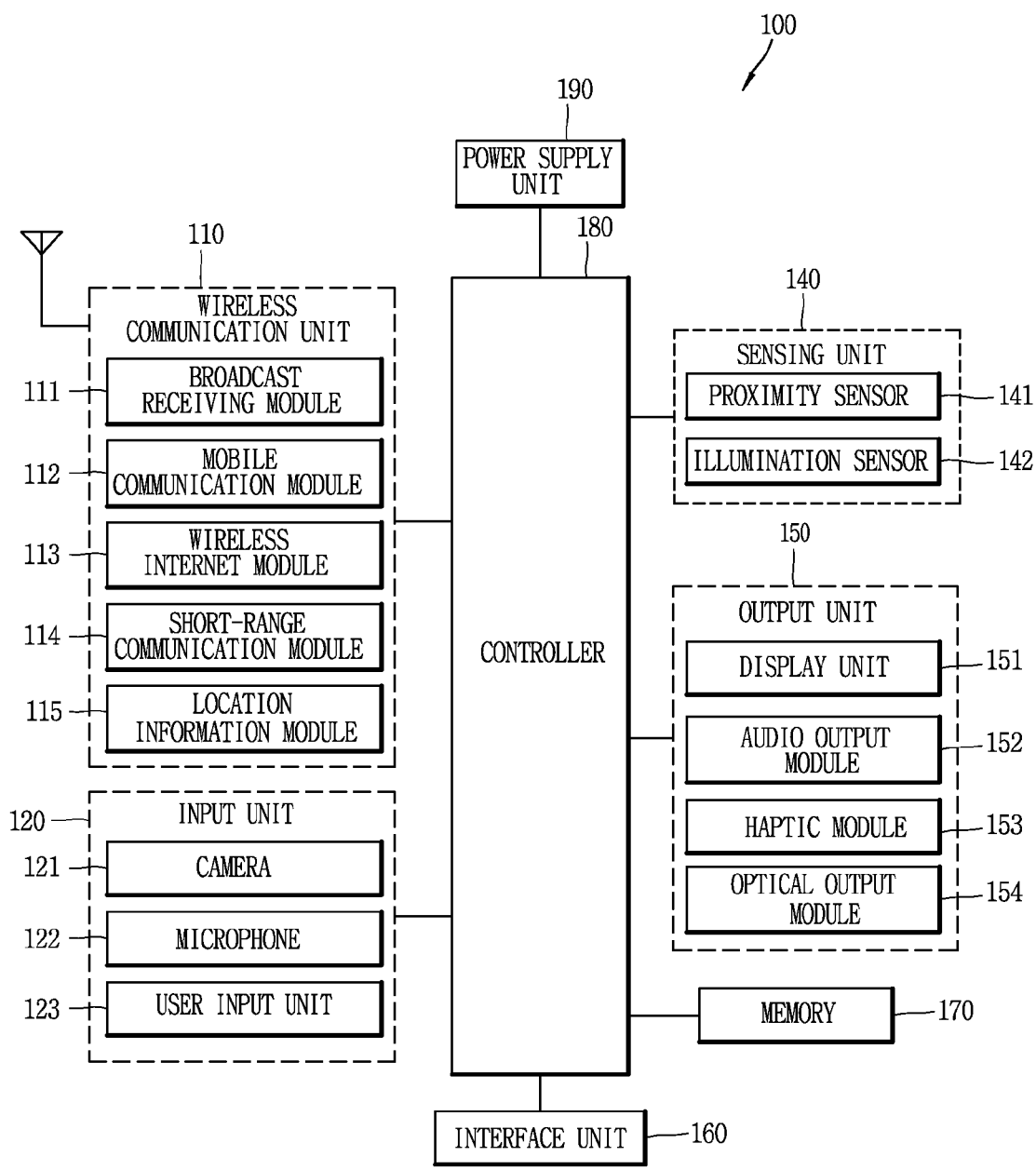
FIG. 1A is a block diagram illustrating a mobile terminal according to the present invention.
Figure 1B:
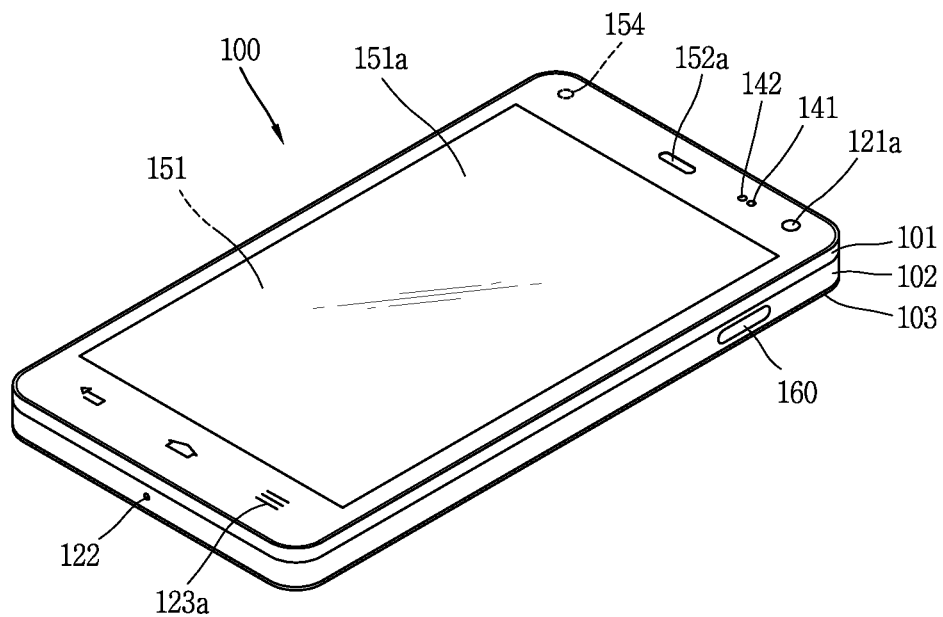
FIGS. 1B and 1C are conceptual views illustrating an example of a mobile terminal according to the present invention, which are viewed from different directions.
Figure 1C:
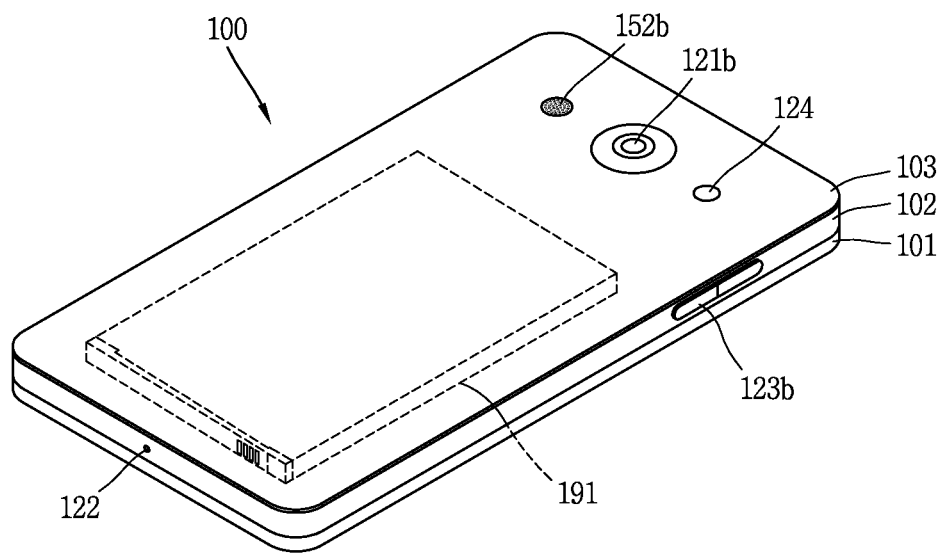

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 10:
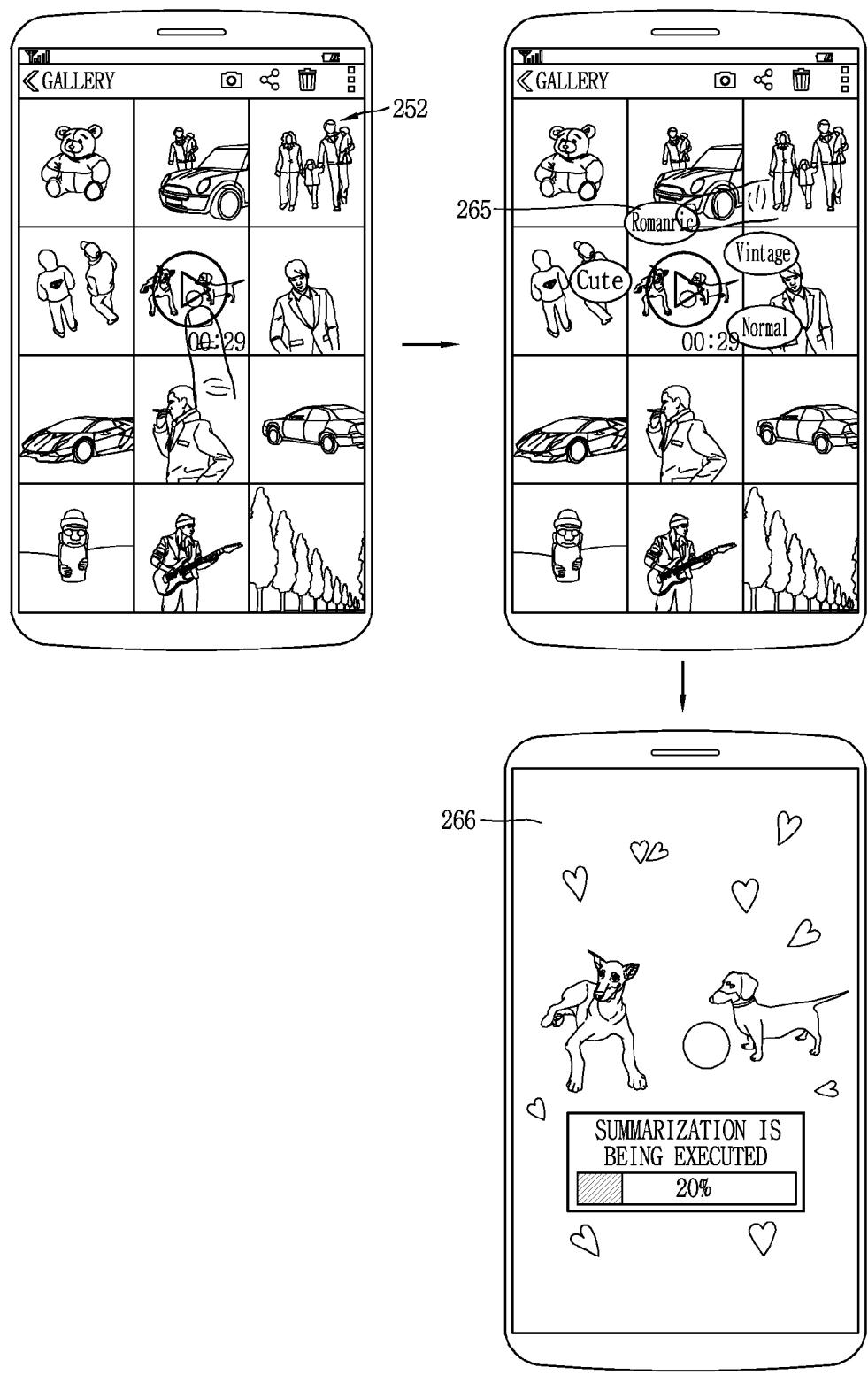
FIGS. 10, 11A and 11B are conceptual views illustrating a control method according to another embodiment of the present invention, which show an easy styling function during video summarization.

Referring now to FIGS. 1B and 10, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 10 depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units

123*a* and 123*b* may also employ any non-tactile method that allows the user to perform manipulation such as proximity touch, hovering, or the like.

FIG. 1B illustrates the first manipulation unit 123*a* as a touch key, but possible alternatives include a mechanical key, a push key, a touch key, and combinations thereof.

Input received at the first and second manipulation units 123*a* and 123*b* may be used in various ways. For example, the first manipulation unit 123*a* may be used by the user to provide an input to a menu, home key, cancel, search, or the like, and the second manipulation unit 123*b* may be used by the user to provide an input to control a volume level being output from the first or second audio output modules 152*a* or 152*b*, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152*a* or 152*b*, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123*a* in the rear input unit. As such, in situations where the first manipulation unit 123*a* is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121*b* is shown located at the rear side of the terminal body and includes an image capturing direction that is substantially opposite to the image capturing direction of the first camera unit 121*a*. If desired, second camera 121*a* may alternatively be located at other locations, or made to be moveable, in order to have a different image capturing direction from that which is shown.

The second camera 121*b* can include a plurality of lenses arranged along at least one line. The plurality of lenses may also be arranged in a matrix configuration. The cameras may be referred to as an "array camera." When the second camera 121*b* is implemented as an array camera, images may be captured in various manners using the plurality of lenses and images with better qualities.

As shown in FIG. 1C, a flash 124 is shown adjacent to the second camera 121*b*. When an image of a subject is captured with the camera 121*b*, the flash 124 may illuminate the subject.

As shown in FIG. 1B, the second audio output module 152*b* can be located on the terminal body. The second audio output module 152*b* may implement stereophonic sound functions in conjunction with the first audio output module 152*a*, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The memory 170 of the mobile terminal may store therein multimedia data. The multimedia data may be a text, a graphics, an image, an animation, an audio, a video, etc. Most of moving image data having video and audio data has a large size. The present invention provides a process for easily editing such moving image data.

The present invention illustrates edition of moving image data (video data). However, the present invention is not limited to this. That is, moving image data to be explained in the following embodiments may be replaced by a graphics, an image, an animation, or audio data.

Hereinafter, a process of editing moving image data more easily will be explained in more detail with reference to the attached drawings.

Figure 2:
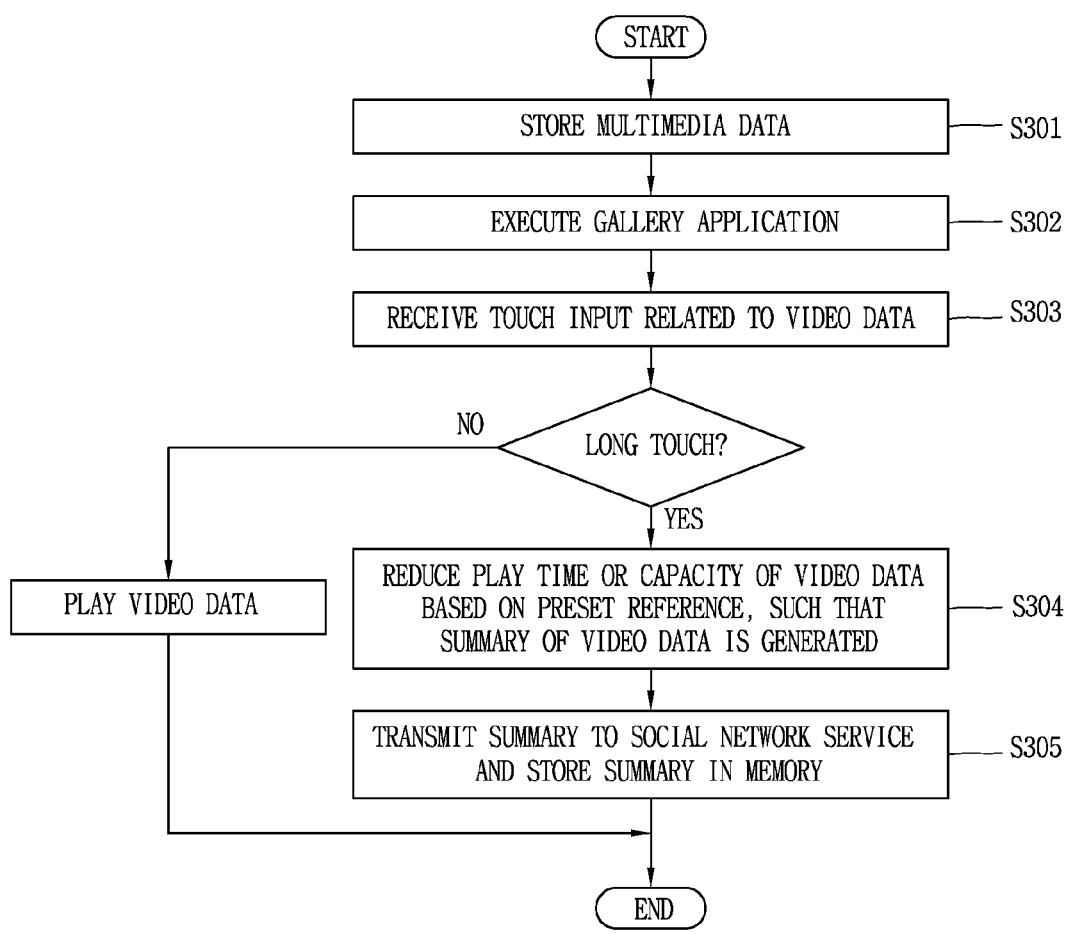
FIG. 2 is a flowchart illustrating a control method according to the present invention.
Figure 3A:
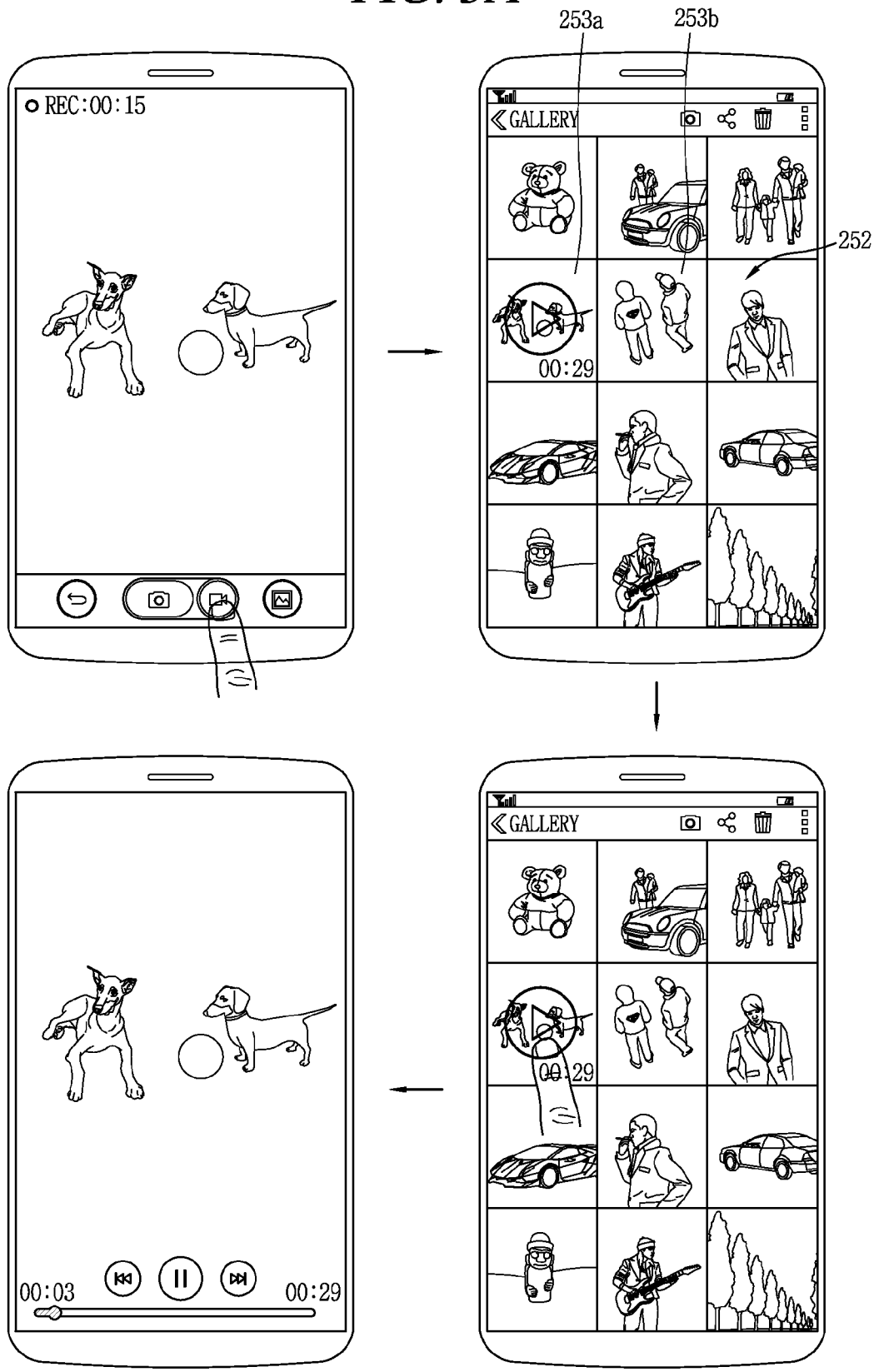
FIGS. 3A and 3B are conceptual views illustrating an operation implemented by the control method.
Figure 3B:
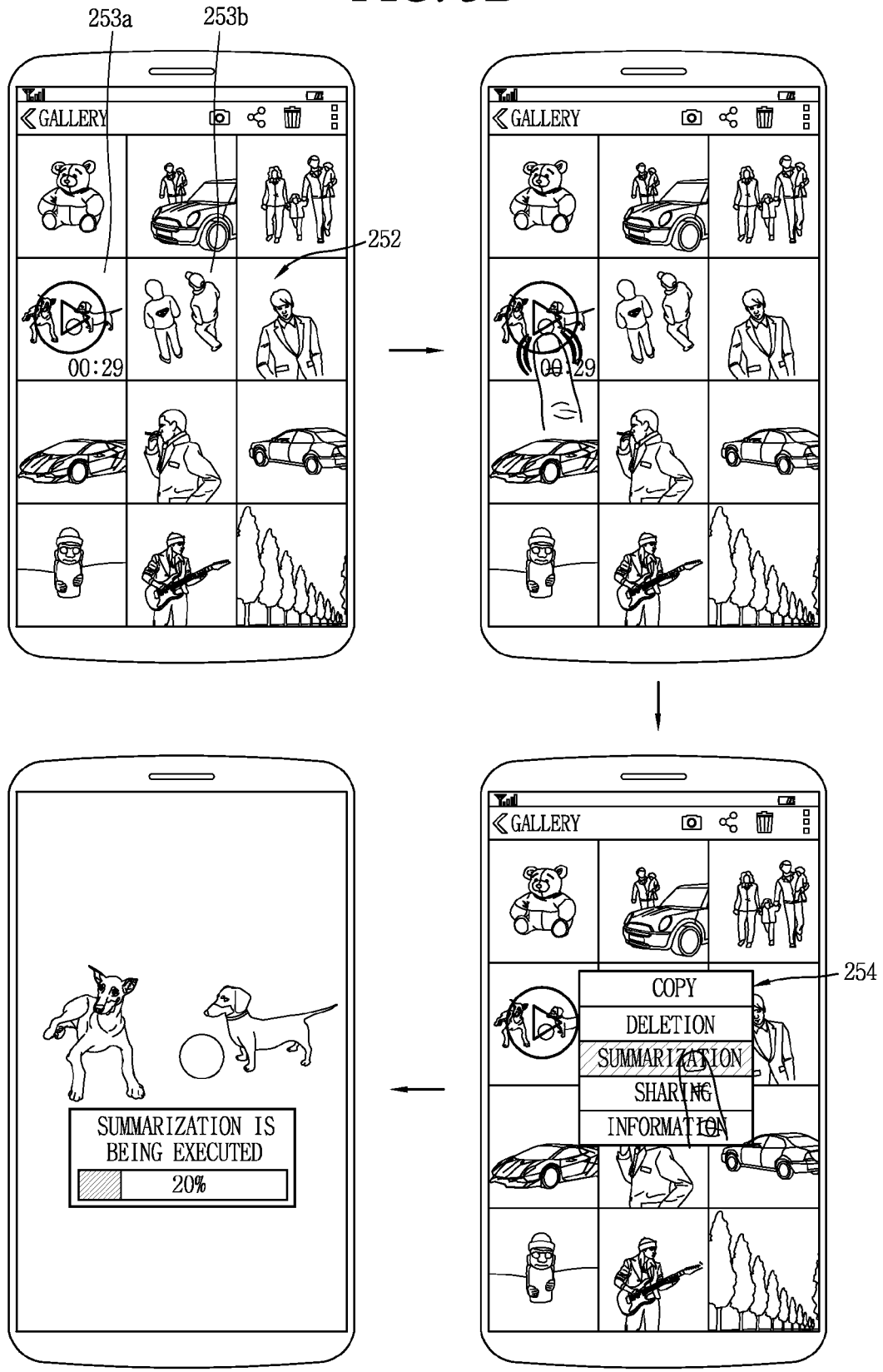

FIG. 2 is a flowchart illustrating a control method according to the present invention, and FIGS. 3A and 3B are conceptual views illustrating an operation implemented by the control method.

The memory 170 (refer to FIG. 1) of the mobile terminal of the present invention stores therein a plurality of multimedia data stored by a user (S301). The multimedia data may have any type. For instance, the multimedia data may be video data, video data obtained as part of a moving image being played is selected, video data pre-stored by a provider of the mobile terminal, audio data recorded by sound-recording, audio data such as a music file, audio data extracted from part of the music file, a captured image, an image having therein screen information output to a touch screen as it is, an image having therein only a photo or a picture included in a webpage, etc.

As shown in FIG. 3A, the multimedia data may be provided with an image acquired by the camera 121. Once a camera application is activated, the controller activates the camera 121 and controls the camera 121 to capture an external environment. The controller acquires an image and an audio obtained by capturing the external environment, based on a capturing control command applied by a user. The controller may immediately store the multimedia data in the memory 170 based on a setting, or may store the multimedia data in the memory 170 based on an additional control command.

Referring to a second drawing of FIG. 3A, the controller outputs an execution screen 252 of a gallery application. In this case, the gallery application is executed by a user's selection (S302).

The gallery application may be executed by a user's touch input applied to a corresponding icon. In response to the touch input, the controller outputs the execution screen 252 of the gallery application. As shown, a plurality of images may be output to the execution screen 252.

A plurality of other images may be output to a touch screen, based on a user's touch input. The number of images output to the touch screen, or the size of each of the images may be changed based on a user's touch input method.

In this case, the plurality of images may include thumbnail images 253a, 253b of the multimedia data stored in the memory. The thumbnail images may include a photo-contracted image, a video-included image, or an image formed as one of images included in a video is output in a contracted manner. The thumbnail images 253a, 253b may be output to the touch screen, together with the execution screen 252. The thumbnail images may be arranged in order that they are obtained by the camera (or they are stored based on a user's other control command). However, the present invention is not limited to this.

Next, in the mobile terminal of the present invention, the touch screen receives a touch input related to video data (S303).

Referring to a third drawing of FIG. 3A, if a touch (or a short touch) is applied to the thumbnail image 253a of video data, the controller senses the touch input.

In response to the touch input, the video data may be played. In this case, as shown in a fourth drawing of FIG. 3A, the video data may be played in an enlarged manner to an entire region of the touch screen.

As another example, on the execution screen 252 of the gallery application shown in a first drawing of FIG. 3B, if other type of touch (e.g., a long touch) is applied to the thumbnail image of video data as shown in a second drawing of FIG. 3B, a summary of the video data may be generated.

The controller may execute a function related to play of the video data, in response to a first touch input applied to the image (e.g., the thumbnail image) related to the video data. And the controller may execute a function related to summarization of the video data, in response to a second touch input different from the first touch input.

In this case, the controller contracts a play time or a capacity of the video data based on a set reference, such that a summary of the video data is generated based on the touch input (S304).

As shown in a third drawing of FIG. 3B, a selection window 254 for selecting a video data summarization function may be popped-up before the video data summarization function is executed. For instance, if a long touch is applied to the touch screen, the selection window 254 including a list of functions related to the video data may be popped-up. And the list may include a summarization item. If a user applies a touch input to the summarization item, a summary of the video data (i.e., a summary of the original video data) is generated (refer to a fourth drawing of FIG. 3B).

In this case, the mobile terminal analyzes the original video data selected by a user, and edits the video data for automatic summarization, thereby generating a summary.

For instance, the controller may extract intra-coded frames from the video data at preset time intervals, thereby generating a summary of the video data using the extracted frames. More specifically, the controller may extract I-Frame per second from the selected video data, and may analyze the extracted frames, thereby generating a summary of the video data. Thus, the number of frames of the summary may be smaller than that of the video data.

In this case, the controller may detect information related to persons' faces from images of the extracted frames, thereby generating a summary of the video data based on the detected information. For instance, the controller may detect a face of a person most-frequently shown in the video data, and may exclude images not including the detected person, thereby generating a summary. Alternatively, the controller may detect faces of persons included in the video data, and may re-edit the video data based on the detected faces.

Alternatively, the controller may analyze images of the extracted frames, and may set an interest region included in the summary of the video data based on the analyzed images. More specifically, the controller may set an interest region from the extracted frames, using a blur detector, a face detector or an image similarity measure. The image similarity measure may be utilized to detect scene conversion, and the face detector may be implemented to obtain a position and a size of a face output to the touch screen. In this case, the interest region may be set by using an additional decision engine.

For instance, the controller may extract similar images among the frame images extracted from the video data. The similar images mean images having a common configuration. That is, the controller compares the images of the extracted frames with each other, thereby extracting similar images having a common region.

The controller analyzes the frame images. For instance, the controller may extract a plurality of frames including a common configuration, such as a subject, a place corresponding to an external environment of the subject, a person and an object included in images, a background state (daytime or nighttime), a state of the person and the object (transformed or non-transformed state), and a storage time of the image. Images having at least one common configuration may correspond to a plurality of frames obtained in the same place. The video data may be edited such that a region including the similar images is set as an interest region, and such that the interest region is included while the remaining regions are excluded. In this embodiment, video data is summarized by setting an interest region. However, the present invention is not limited to this. That is, video data may be summarized based on a preset reference in various manners.

The summary is generated such that a play time or a capacity of the video data is reduced based on a preset reference. The preset reference is established based on a restriction condition of a social network service (SNS) for sharing the video data. More specifically, the reference is set based on a restriction condition of an application related to a social network service (SNS) for sharing the video data.

For instance, if a play time of video data uploaded to a social network service (SNS) for sharing the video data is restricted to 15 seconds, the summary is edited such that its play time is less than 15 seconds. As an example, if a play time of the original video data is 2 minutes, a play time of the summary may be contracted to 15 seconds. As another example, if a capacity of video data uploaded to a social network service is restricted to 100 megabytes, the summary may be edited such that its capacity is less than 100 megabytes.

The preset reference may be established based on a restriction condition of a specific application to which video data can be uploaded, rather than a restriction condition of a social network service. For instance, when the video data is transmitted to a computer, a server, etc. by a cloud application which backs-up data, a summary satisfying a restriction condition of the cloud application may be generated to be transmitted.

The summary of the video data, having a reduced play time or capacity, is transmitted to a social network service selected by a user, and is stored in the memory of the mobile terminal (S305). Upon generation of the summary, a thumbnail image of the summary may be output to the execution screen of the galley application, together with a thumbnail image of the video data.

In the present invention, a summary generated by such a process may be re-edited in another form by a user's request. For instance, after a summary is recognized by a user, the user may play the summary and then set a region to be included in the summary.

With such a process, multimedia data is summarized based on a restriction condition of a social network service. This may allow a summary satisfying a user's request and a request of a social network service, to be generated automatically.

In the above embodiment, a basic control method for automatically summarizing video data was explained, and the basic control method may be applied in various manners. Hereinafter, an automatic video summarization function during video sharing, an easy sharing function during video summarization, an easy styling function during video summarization, a target time setting function during video summarization, etc., will be explained in more detail with reference to the attached drawings.

Figure 4A:
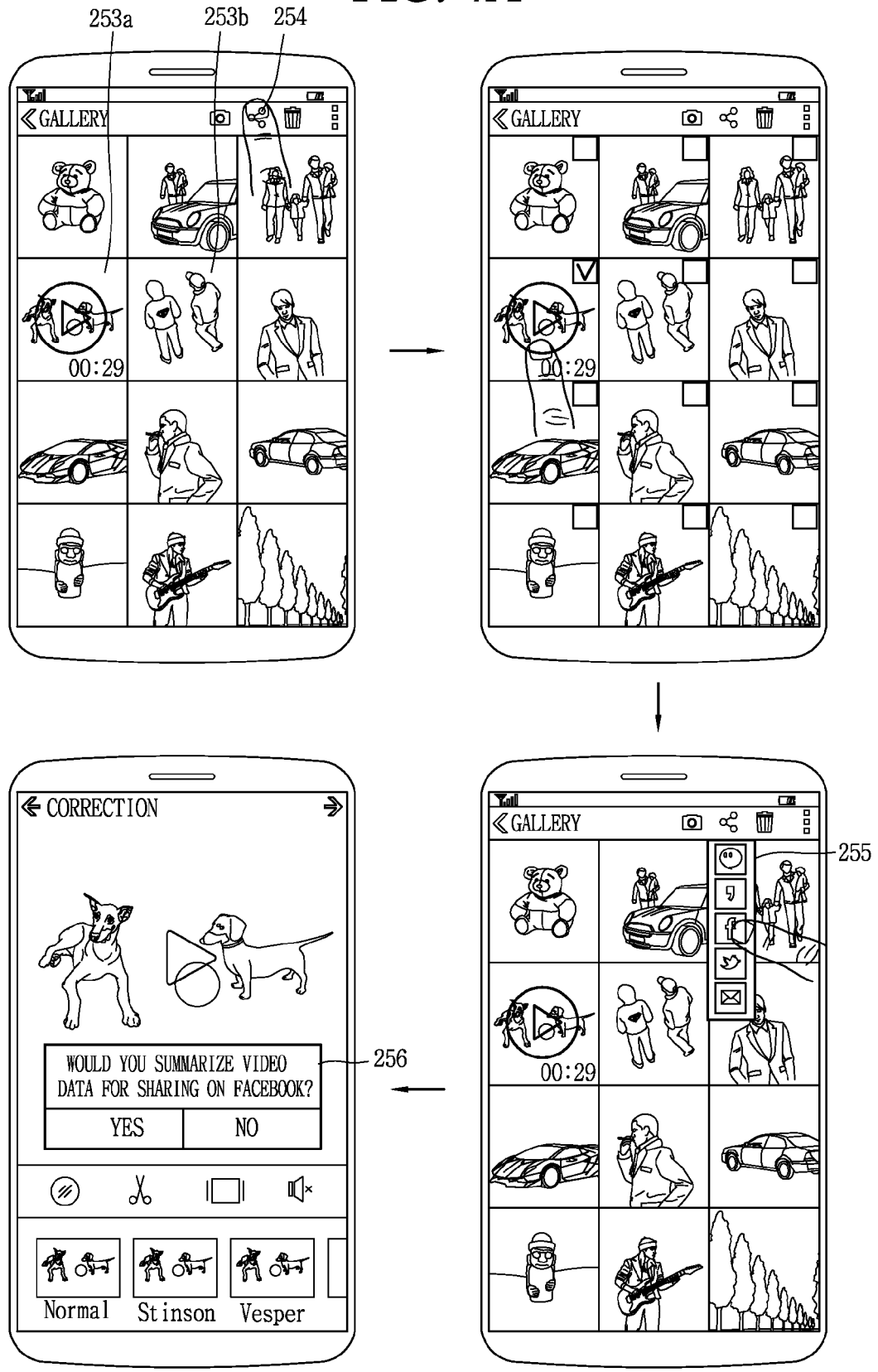
FIGS. 4A and 4B are conceptual views illustrating a control method according to another embodiment of the present invention, which show a function to automatically summarize video data during video sharing.
Figure 4B:
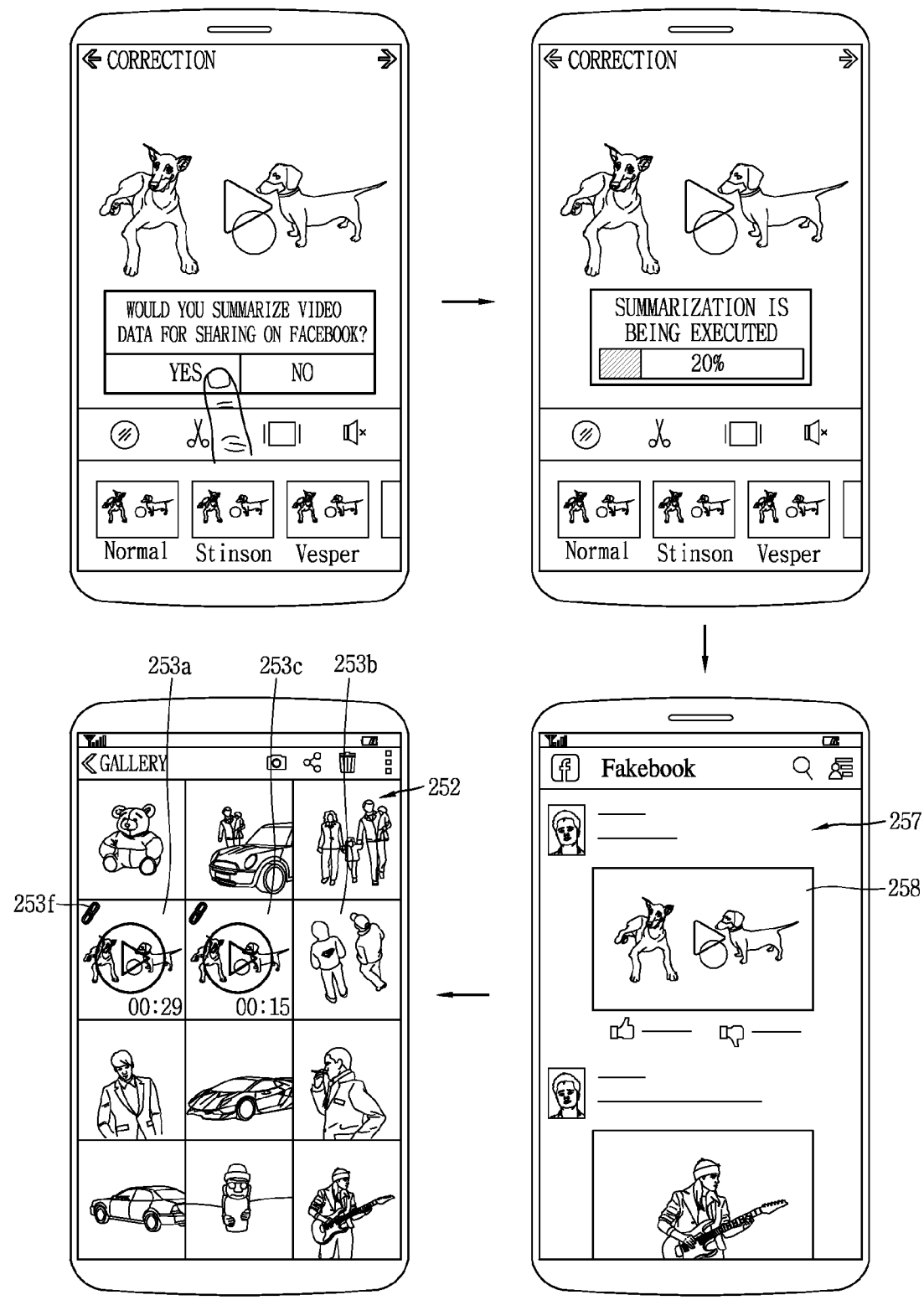
Figure 5:
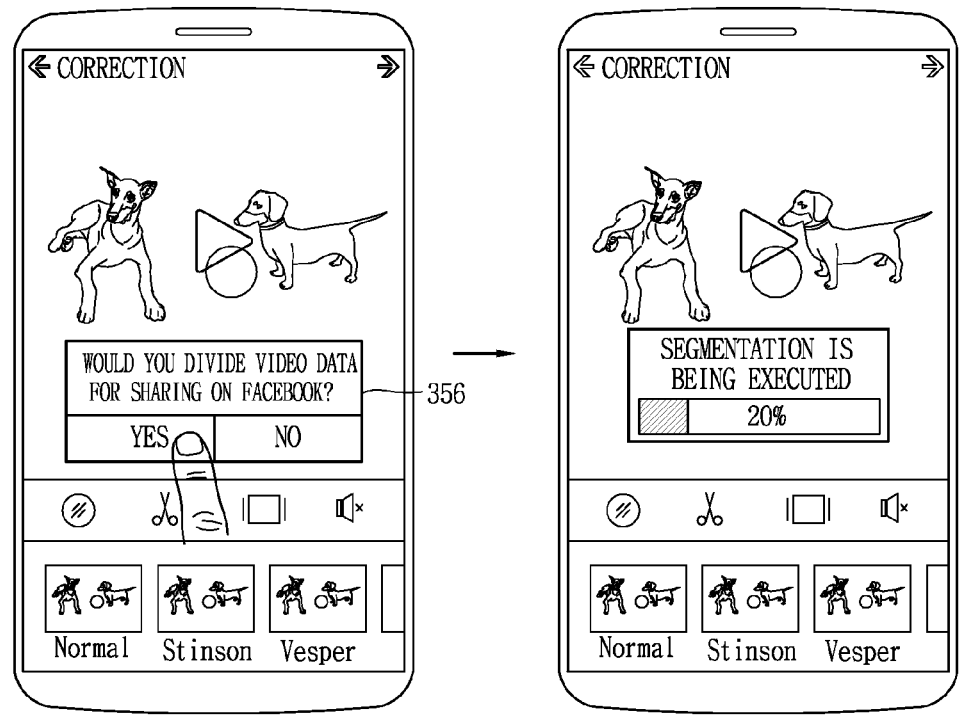
FIG. 5 is a conceptual view illustrating a function to automatically summarize video data according to another embodiment of the present invention.
Figure 5:
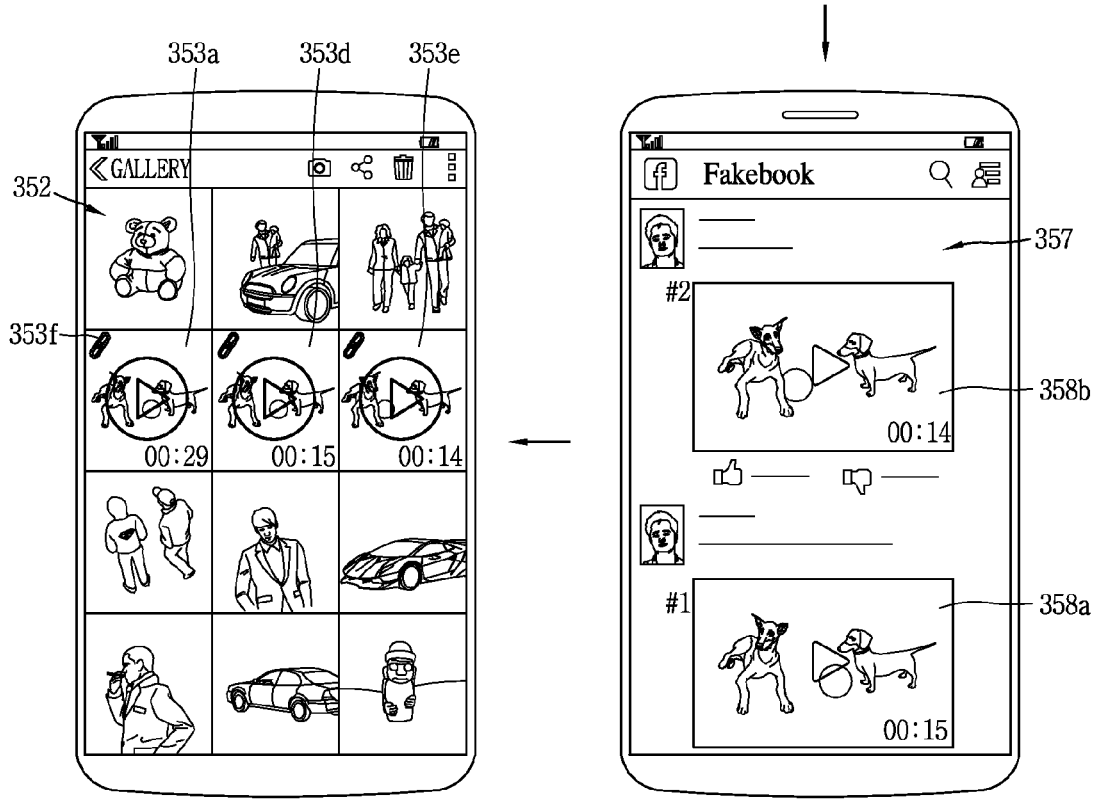
Figure 6:
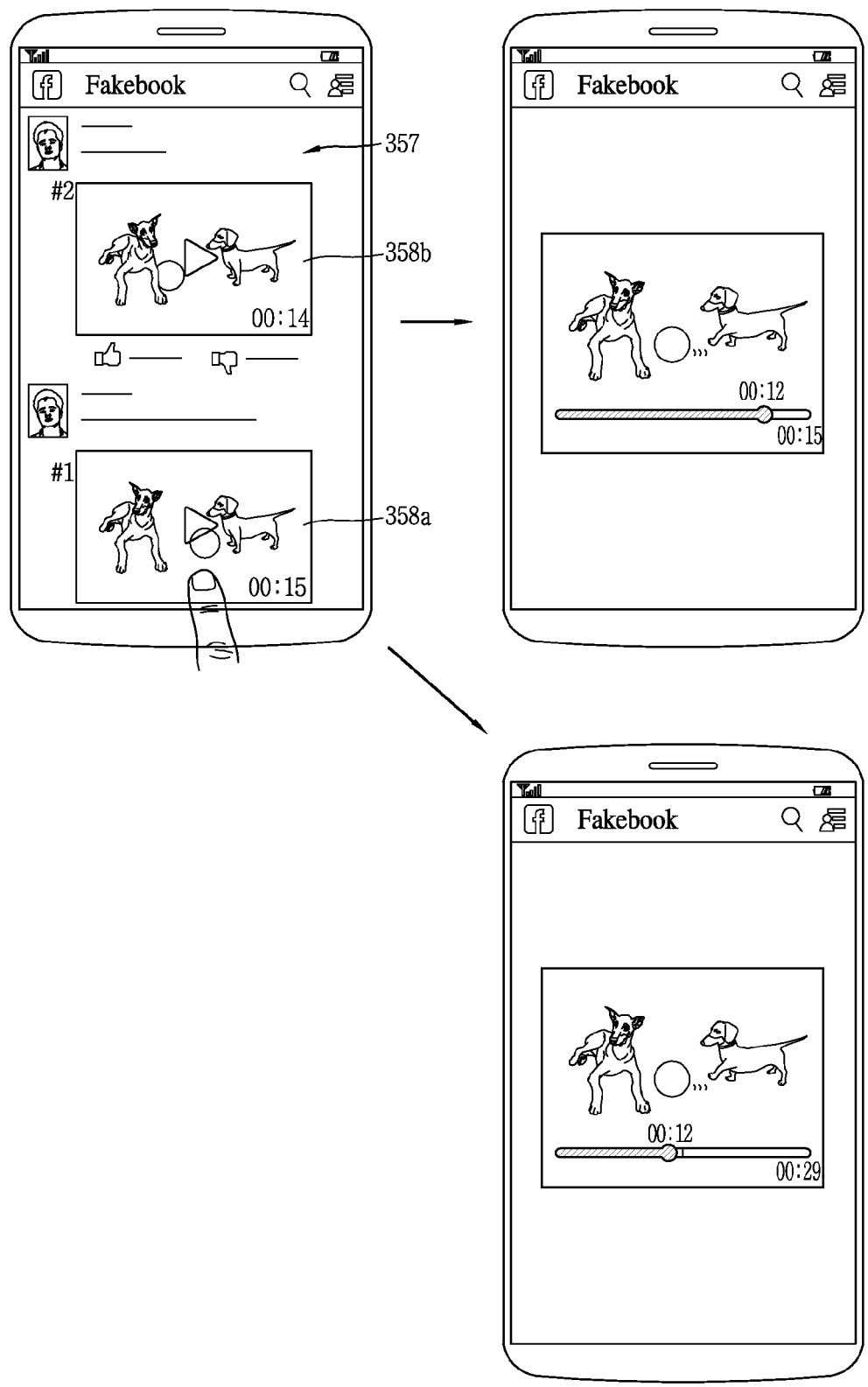
FIG. 6 is a conceptual view illustrating a function to receive summaries generated by a control method aforementioned in FIG. 5, by other mobile terminal.

FIGS. 4A and 4B are conceptual views illustrating a control method according to another embodiment of the present invention, which show a function to automatically summarize video data during video sharing. FIG. 5 is a conceptual view illustrating a function to automatically summarize video data according to another embodiment of the present invention. And FIG. 6 is a conceptual view illustrating a function to receive summaries generated by the control method aforementioned in FIG. 5, by other mobile terminal.

As aforementioned, video data may be summarized based on a restriction condition of a social network service, or a restriction condition of a specific application. In this case, the summary may be generated while the video data is uploaded to a social network service for sharing.

More specifically, as shown in FIG. 3A, the execution screen 252 of the gallery application is output to the touch screen, and the execution screen 252 may include thumbnail images 253a, 253b of multimedia data stored in the memory 170 of the mobile terminal (refer to FIG. 1). For instance, the thumbnail image 253a of the video data may be output to the execution screen 252. In this case, the plurality of thumbnail images output to the touch screen may have a reduced size of the original video data, for a substantial same size. The thumbnail images 253a, 253b may be sequentially arranged in storage order in the memory, a storage method, a capacity, etc. The controller may control the touch screen such that a larger or smaller number of images may be output, based on a pinch-in touch input or a pinch-out touch input, in a state where the thumbnail images 253a, 253b have been output.

If a preset touch input is received or a touch input applied to a specific icon is received, in a state where the thumbnail images 253a, 253b have been output, the controller 180 may control the touch screen such that a list of applications or social network services which can share the video data may be output.

For instance, the icon 254 for data sharing may be output to one side of the execution screen 252, and the thumbnail images 253a, 253b to be shared may be activated in a selectable manner by a touch input applied to the icon 254. A user may select the video data by applying a touch input to the thumbnail image of the video data. If the thumbnail image 253a of the video data is selected by a user's touch input, a list of applications or social network services which can share the video data may be popped-up.

The list 255 includes applications or social network services which can share video data, in the form of items. If a user selects for one of the items, a summary to be transmitted to a corresponding application or social network service may be generated.

In this case, if a user applies a touch input to one of the items displayed on the list, as shown in a fourth drawing of FIG. 4A, a selection window 256 for selecting a summarization function by inputting a summarization command before the video data is summarized, may be output. If the user selects for the summarization command from the selection window 256 as shown in FIG. 4A, the controller may generate a summary and then transmit the summary to the selected application or social network service as shown in FIG. 4B, rather than transmitting the video data to the selected application or social network service.

In this case, the summary may be generated to satisfy a restriction condition of the selected application or social network service. For this, upon selection of a social network service for sharing the video data, the controller may detect a restriction condition of the selected social network service in order to establish the preset reference. For instance, the controller may extract information from the video data, and may determine whether the video data satisfies the restriction condition based on the information. More specifically, the controller may extract information from the video data (e.g., a length of the video data or a file size). If a corresponding file is to be shared, the controller may determine whether a social network service for sharing the video data has a restriction condition. If the video data does not satisfy the restriction condition, the selection window for a user's selection for summarization of the video data may be output to the touch screen.

In this case, the summary may be generated by connecting short clips (about 2 seconds) extracted from a plurality of regions of the video data, to each other. In such a manner, the method for editing video data or the method for summarizing video data, which have been aforementioned with reference to FIGS. 2 to 3B, may be applied.

As shown in FIG. 4B, the summary is transmitted to a server of the social network service. In this case, attribute information of the video data may be transmitted together. That is, when the generated summary is transmitted, information on the video data may be transmitted to the server of the social network service. For instance, attribute information of the original data, e.g., information on minutes, a data format and a download website, may be transmitted together with the summary.

A thumbnail image 258 of the summary may be output to an execution screen of the social network service (or an execution screen of an application of the social network service), as an uploaded result of the summary. The summary includes attribute information of the original data in the form of linked information. The attribute information of the original data may be output to the execution screen 257 of the social network service, according to a user's request.

Upon generation of the summary, the mobile terminal may mark information indicating that the summary is included in the original data, or may mark information indicating that the summary includes the original data. That is, information related to the summary may be recorded in the video data, or information related to the video data may be recorded in the summary.

In this case, a thumbnail image 253c of the summary may be output to the execution screen 252 of the gallery application, together with the thumbnail image 253a of the video data. An icon 253f for outputting the marked information to the touch screen may be displayed on the thumbnail image 253c of the summary, and on the thumbnail image 253a of the video data.

For instance, the icon 253f may be an icon to which a URL of the original video data has been linked. In this case, a person who has received the summary can view the original video data rather than the summary, by clicking the icon 253f. As another example, a user who is viewing the summary can view the original video data by clicking the icon 253f.

As shown in FIG. 5, the video data may be divided into a plurality of files so as to satisfy a restriction condition of an application or a social network service for sharing the video data.

More specifically, in a state where a list of applications or social network services for sharing the video data has been popped-up by the process aforementioned with reference to FIG. 4A, if a user selects for a desired item, a plurality of summaries of the video data which is to be transmitted to a corresponding application or social network service may be generated. In this case, the plurality of summaries may be transmitted to the social network service. Upon reception of the plurality of summaries from the social network service, the plurality of summaries may be integrated into a single video.

As another example, a plurality of segmented sections of the video data may be generated. The segmented sections are generated by dividing the original video data, and a segmented section is provided with the same data as a corresponding region of the original video data. In this case, if a user selects for an item for sharing the video data, a selection window for selecting a summarization function or a segmentation function may be additionally output. If the user selects for the summarization function, a summary may be generated. And if the user selects for the segmentation function, segmented sections may be generated.

In this embodiment, a control method with respect to the plurality of segmented sections will be explained. However, the method may be also applicable in case of summarization or edition. In this case, the segmented sections may refer to summaries.

As shown in FIG. 5, if a user selects for 'YES' from a selection widow 356 for selecting segmentation of the video data, the video data is not transmitted to a selected application or social network service, but segmented sections are generated.

In this case, the segmented sections may be generated so as to meet a restriction condition of the selected application or social network service. For instance, if a restriction condition of the selected application or social network service is a video length within 15 seconds, the original video data may be divided into a plurality of segmented sections by being segmented per 15 seconds.

For this, upon selection of a social network service which is to share the video data, the controller may detect a restriction condition of the selected social network service, in order to establish the preset reference. For instance, the controller may extract information from the video data, and may determine whether the video data satisfies the restriction condition based on the information. More specifically, the controller may extract information from the video data (e.g., a length of the video data or a file size). If a corresponding file is to be shared, the controller may determine whether a social network service for sharing the video data has a restriction condition. If the video data does not satisfy the restriction condition, the selection window for a user's selection for segmentation of the video data may be output to the touch screen.

The segmented sections are sequentially transmitted to a server of the social network service. In this case, attribute information of the video data may be transmitted together. That is, when the segmented sections are transmitted, information on the original data (e.g., information on minutes, a data format and a download website) may be transmitted together with the segmented sections.

Thumbnail images 358a, 358b of the segmented sections may be output to an execution screen 357 of the social network service (or an execution screen of an application of the social network service), as an uploaded result of the segmented sections. The segmented sections include information to which attribute information of the original data has been linked. The attribute information of the original data may be output to the execution screen 357 of the social network service, according to a user's request.

Upon generation of the segmented sections, the mobile terminal may mark information indicating that the segmented sections are included in the original data, or may mark information indicating that the segmented sections include the original data. In this case, thumbnail images 353d, 353e of the segmented sections may be output to the execution screen of the gallery application, together with a thumbnail image 353a of the video data. An icon 353f for outputting the marked information to the touch screen may be displayed on the thumbnail images 353d, 353e of the segmented sections, and on the thumbnail image 353a of the video data.

Referring to FIGS. 5 and 6, thumbnail images 358a, 358b of the segmented sections are sequentially displayed on the execution screen 357 of the social network service (or an execution screen of an application of the social network service). If a user applies a touch input to one of the thumbnail images 358a, 358b, a corresponding segmented section is played.

In this case, the segmented sections uploaded to the server of the social network service may be integrated with each other by a mobile terminal which receives the segmented sections. For instance, if a user applies a touch input to one of the thumbnail images 358a, 358b, a corresponding segmented section is not played, but the segmented sections may be played consecutively. That is, the same video as the original video data, which has been obtained as the segmented sections are integrated with each other is played.

More specifically, if a user who has received the segmented sections clicks the first segmented section in order to automatically integrate the segmented sections with each other, the original video data obtained as the segmented sections are integrated with each other may be transmitted to other mobile terminal. As another example, the segmented sections may be transmitted to said other mobile terminal, and said other mobile terminal may generate video data based on information on the segmented sections, the video data obtained as the segmented sections are integrated with each other.

With such a process, the mobile terminal may share the original video data with other mobile terminal, with satisfying a restriction condition of a social network service.

Figure 7:
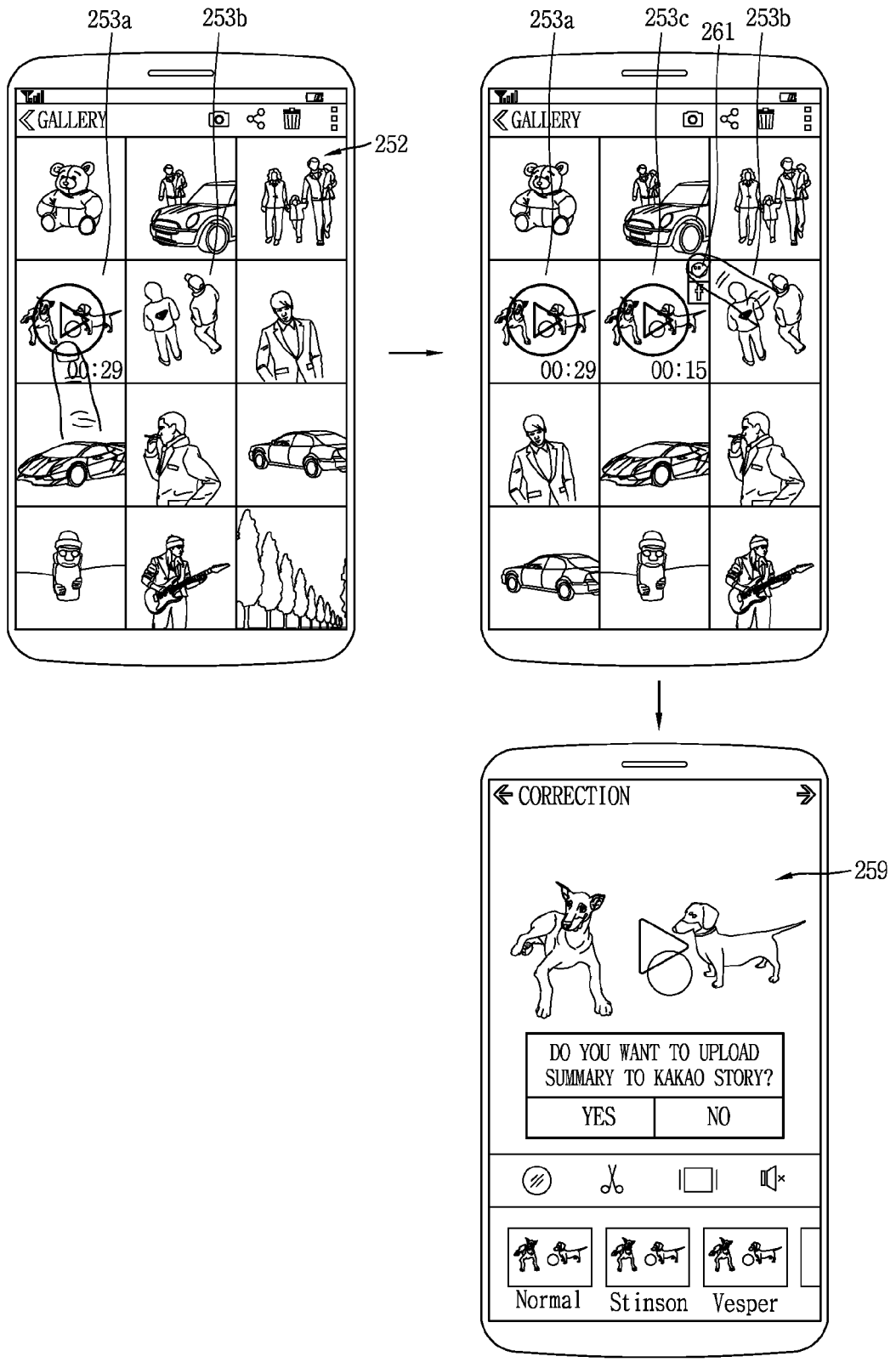
FIGS. 7, 8, and 9 are conceptual views illustrating a control method according to another embodiment of the present invention, which show an easy sharing function during video summarization.
Figure 8:
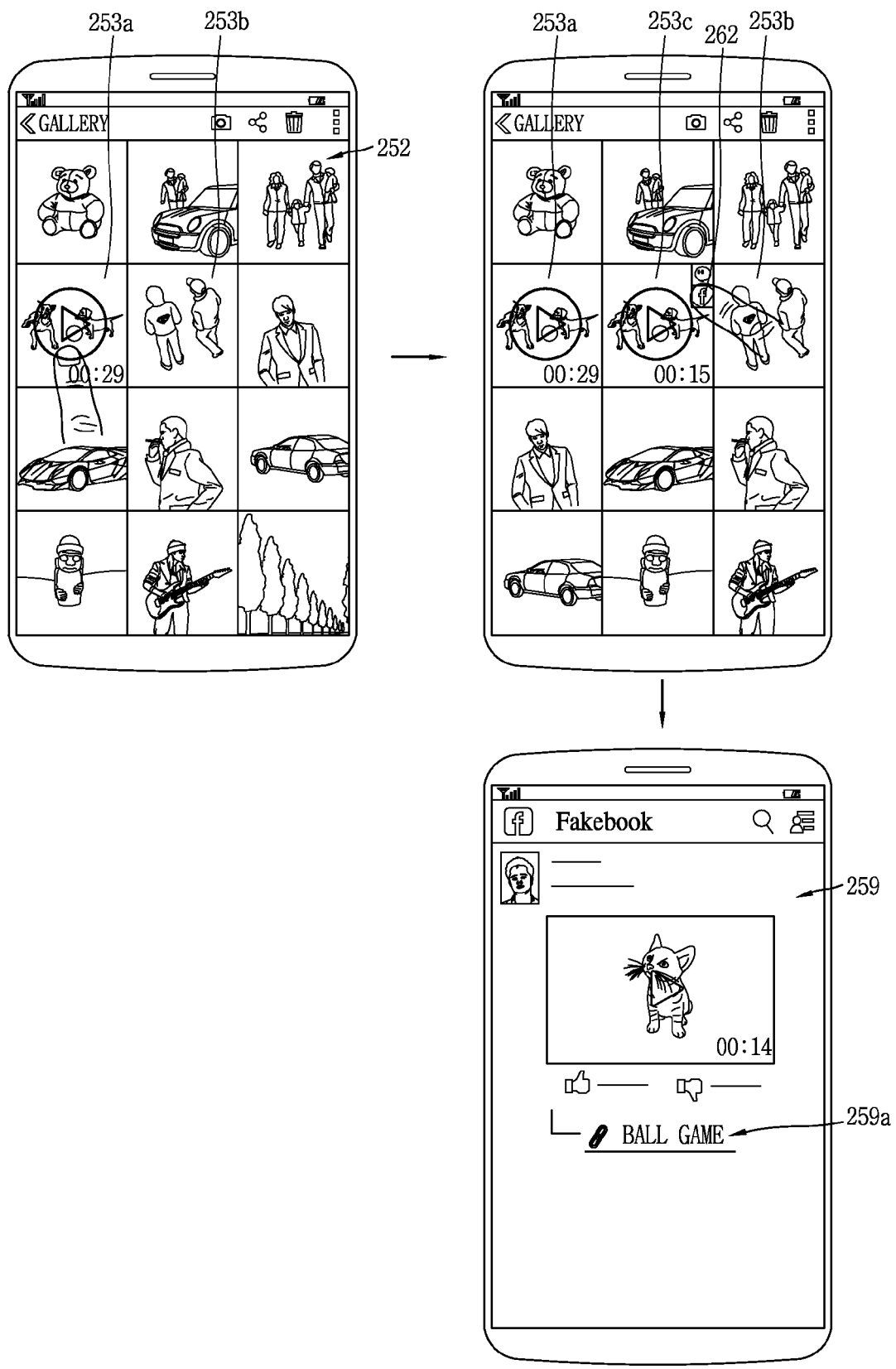
Figure 9:
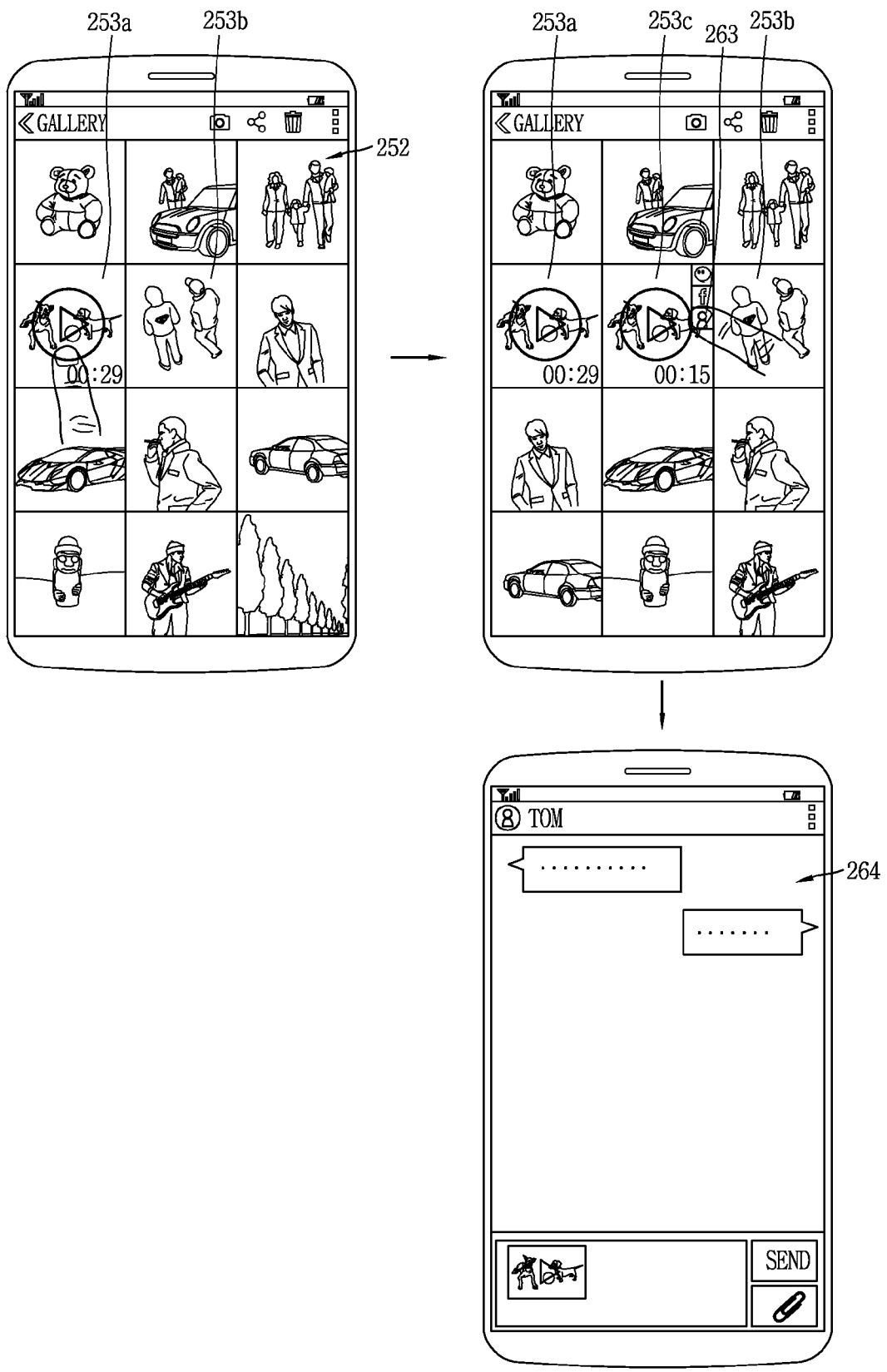

So far, an automatic video summarization function during video sharing has been explained. Hereinafter, an easy sharing function during video summarization will be explained. FIGS. 7 to 9 are conceptual views illustrating an easy sharing function during video summarization.

In this embodiment, the controller may recommend an application or a social network service suitable for a summary. In this case, icons for selecting the recommended application or social network service may be output to the touch screen, in an overlapped manner with an image of the summary.

For instance, as aforementioned with reference to FIG. 3B, if a touch input (e.g., a long touch) is applied to a thumbnail image of video data on the execution screen 252 (refer to FIG. 3B) of the galley application, a summary of the video data may be generated. That is, the controller may execute a function related to play of the video data, in response to a first touch input applied to an image related to the video data (e.g., a thumbnail image). And the controller may execute a function related to summarization of the video data, in response to a second touch input applied to the image related to the video data.

In this case, the controller reduces a play time or a capacity of the video data based on a preset reference, such that a summary of the video data is generated based on the touch input. A method or reference for generating the summary may be replaced by the description aforementioned with reference to FIGS. 2 to 3B, and thus its detailed explanations will be omitted.

In this embodiment, the controller recommends an application or a social network service suitable for a summary, by analyzing images included in the summary. For this, the controller recognizes faces and analyzes content when generating the summary from video data. More specifically, the controller detects information related to a person's face, from images of extracted frames, and analyzes content based on the information. Then, the controller determines a type of a corresponding video based on the analyzed content. For instance, if a detected face corresponds to a baby's face, the video data may be classified into video data related to the baby. As another example, if a detected face corresponds to a celebrity's face, the video data may be classified into video data related to the celebrity.

In this case, a history on sharing of the video data may be pre-stored according to a type of the video data. For instance, in case of the video data related to the baby, a history on a social network service to which baby images have been uploaded is stored.

The controller may analyze the pre-stored history, thereby recommending an application or a social network service suitable for a type of the generated summary. In this case, icons for selecting the recommended application or social network service may be output to the touch screen, in an overlapped manner with a thumbnail image of the summary.

Referring to FIG. 7, in a state where an icon 261 for selecting a specific social network service has been displayed on the thumbnail image 253c of the summary, if a user applies a touch input to the icon 261, the social network service may be selected. In this case, a history on transmission and reception of other images corresponding to a type of the summary is analyzed. And an execution screen 259 for transmitting the summary to the social network service which has previously transmitted and received said other images may be outputted. Information indicating that the summary is to be transmitted may be output to the execution screen 259, and the summary may be transmitted to the server of the social network service according to a user's selection.

As another example, referring to FIG. 8, icons for selecting the recommended social network service may include an icon 262 for executing a function to generate a connection with previously-uploaded multimedia data.

For instance, a history on a social network service to which pet images have been uploaded is stored. And information indicating that the video data has a summary including a captured user, may be linked to an image uploaded to the social network service.

More specifically, referring to FIG. 8, if video data mainly including animals is summarized, a social network service to which pet images have been mainly uploaded may be detected. The icon 262 for recommending the social network service may be displayed on a thumbnail image of the summary. If a user applies a touch input to the thumbnail image, information indicating that the video data has a summary, may be transmitted to the social network service. Based on the information, information 259a indicating that the video data has a summary may be displayed on at least one of the pet images displayed on an execution screen of the social network service, e.g., a most-recently uploaded image.

As another example, referring to FIG. 9, icons for selecting a recommended application may include an icon 263 which represents at least one of persons stored in an address book. If a user applies a touch input to the icon 263, a function to send a text message to a contact number stored with respect to the person, or a function to attempt a call through a connection with a call signal may be executed.

More specifically, if a person included in a summary of the video data is included in an address book, it may be detected whether a history on transmission of multimedia data to the figure has been recorded or not. If the history on transmission of multimedia data to the figure is more than a preset reference, the icon 263 for executing a function to send a text message to a contact number stored with respect to the person may be displayed on a thumbnail image of the summary. If a user applies a touch input to the thumbnail image, a function to send a text message to a contact number stored with respect to the person with attaching the summary may be executed. In this case, an execution screen 264 for sending a text message may be output.

As another example, if a person included in a summary of video data is included in an address book, a history on a call connection with the figure may be analyzed. If the call connection is more than a preset frequency (the number of times), an icon for executing a function to send a call signal to a contact number stored with respect to the person may be displayed on a thumbnail image of the summary. In this case, if a user applies a touch input to the thumbnail image, a call connection may be attempted as a call signal is transmitted to a contact number stored with respect to the person. A user may directly inform another party of existence of the summary of the video data, through the call connection.

So far, a function to easily share video data has been explained. Hereinafter, an easy styling function during video summarization will be explained.

Figure 11A:
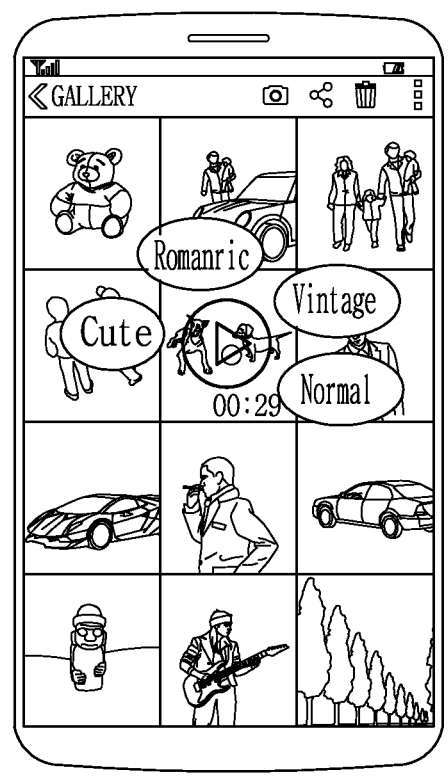
Figure 11B:
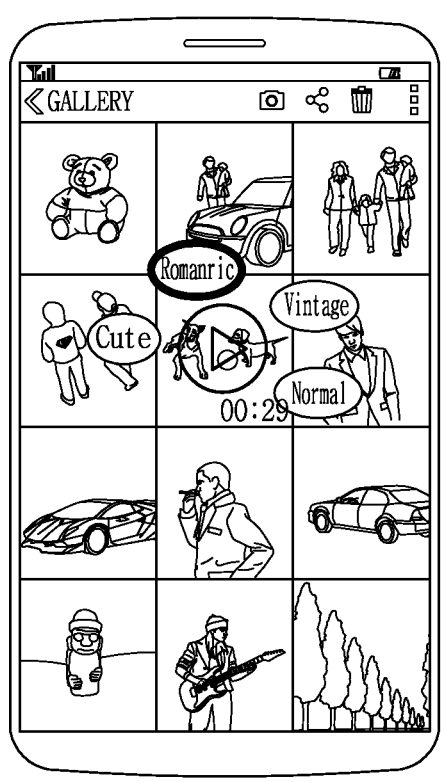

FIGS. 10, 11A and 11B are conceptual views illustrating a control method according to another embodiment of the present invention, which show an easy styling function during video summarization.

In this embodiment, the controller may execute a function to recommend a template suitable for a summary.

For instance, as aforementioned with reference to FIG. 3B, if a touch input (e.g., a long touch) is applied to a thumbnail image of video data on an execution screen of a galley application, a summary of the video data may be generated. That is, the controller may execute a function related to play of the video data, in response to a first touch input applied to the image (e.g., the thumbnail image) related to the video data. And the controller may execute a function related to summarization of the video data, in response to a second touch input different from the first touch input.

Referring to FIG. 10, the controller may execute a process to select a style template by a user, before executing summarization of the video data. For instance, if a long touch is applied to the thumbnail image 253a of the video data, icons 265 for selecting style templates may be output to regions near the thumbnail image 253a. The style templates include a cute template, a romantic template, a vintage template, a normal template, etc. For instance, in case of the cute template, a flowery background may be synthesized with the summary. And in case of the romantic template, a heart background 266 may be synthesized with the summary. That is, the style templates may serve to provide a visual effect, background music (BGM), etc. to an image. As another example, it is possible to generate a summary by checking content of the video data and by editing the content into video data related to animals, persons, food, picture quality, etc.

In this case, the controller may recommend a style template to a user, by controlling a size of an icon of the style template by analyzing the content of the video data (refer to FIG. 11A), or in a highlighting manner (refer to FIG. 11B). For this, the controller recognizes a face and analyzes content when generating a summary from the video data. More specifically, the controller detects information on a person's face from an image of an extracted frame, and analyzes content based on the detected information. Then, the controller determines a style template suitable for a corresponding video.

For instance, if a detected face corresponds to a man's face and a woman's face, the controller may recommend a romantic style template. As another example, if persons are talking with each other, the controller may recommend a style template where text messages corresponding to the talks are output to speech balloons. As shown in FIG. 11A, the controller may control a size of each icon in a recommended order, and may output the icons. Alternatively, as shown in FIG. 11B, the controller may highlight an icon corresponding to a style template recommended especially.

After the recommendation of the style template, if a user selects for one of the icons, the controller summarizes the video data using the style template. In this case, the controller reduces a play time or a capacity of the video data based on a preset reference, such that a summary of the video data is generated by having the style template as a background. A method or reference for generating the summary may be replaced by the description aforementioned with reference to FIGS. 2 to 3B, and thus its detailed explanations will be omitted.

So far, an easy styling function has been explained. Hereinafter, a target time setting function during video summarization will be explained.

Figure 12:
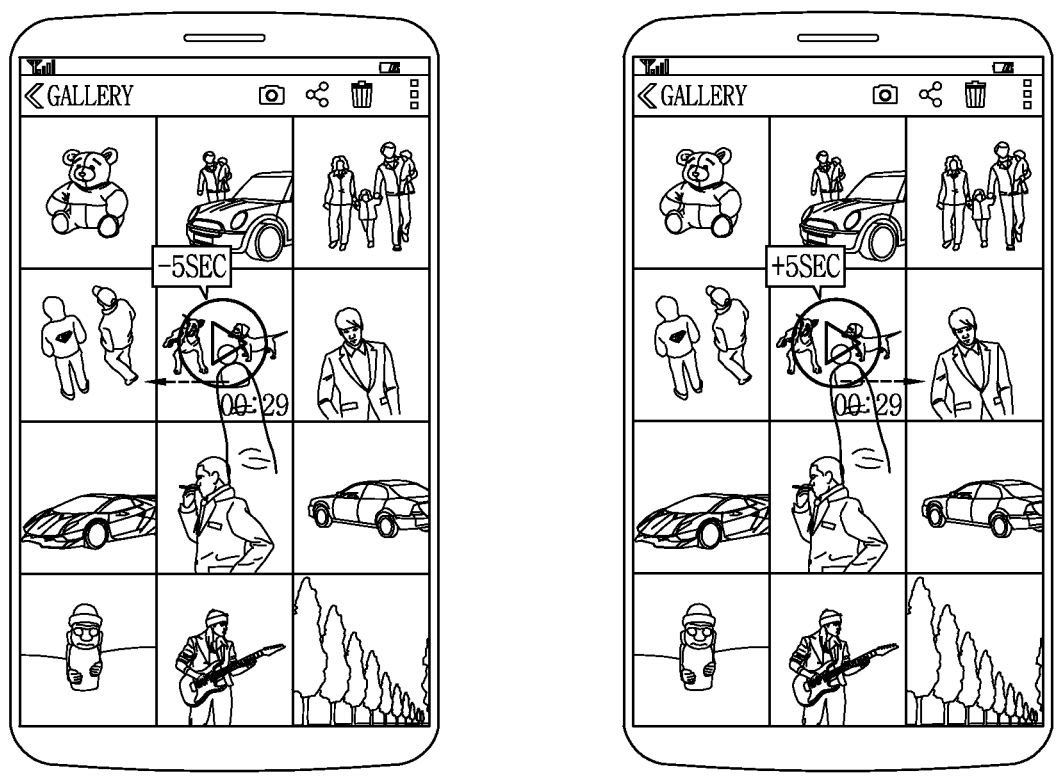
FIG. 12 is a conceptual view illustrating a control method according to another embodiment of the present invention, which shows a target time setting function during video summarization.

FIG. 12 is a conceptual view illustrating a control method according to another embodiment of the present invention, which shows a target time setting function during video summarization.

Referring to FIG. 12, an image related to video data (e.g., a thumbnail image) is output to the touch screen. The controller executes a function related to play of the video data, in response to a first touch input applied to the image. And the controller executes a function related to summarization of the video data, in response to a second touch input different from the first touch input.

For instance, the controller reduces a play time or a capacity of the video data based on a preset reference, such that a summary of the video data is generated based on the second touch input. Processes for selecting an image related to the video data, and executing summarization of the video data may be replaced by the processes aforementioned with reference to FIGS. 2 to 11B. For instance, if the image related to the video data is long-touched, a selection window for selecting generation of a summary of the video data may be popped-up. And if a summary generating command is applied to the selection window, a summary of the video data may be generated.

The preset reference may be based on a restriction condition of a social network service for sharing the video data. Further, the preset reference may be variable according to a type of the second touch input. For instance, a size of the preset reference may be variable according to a drag direction of an image related to the video data. For instance, if the image related to the video data is dragged to the left, the summary may have a decreased length. On the other hand, if the image related to the video data is dragged to the right, the summary may have an increased length. However, the present invention is not limited to this. Upon input of a command to generate a summary of the video data using the selection window, a menu for establishing the preset reference may be popped-up.

More specifically, if a play time of a video uploaded to a social network service for sharing the video data is limited to 15 seconds, the summary of the video data may be generated based on 10 seconds. In this case, if the image related to the video data is dragged to the left, the summary may be edited such that its play time is 5 seconds. On the other hand, if the image related to the video data is dragged to the right, the summary may be edited such that its play time is 15 seconds.

As another example, the preset reference may be set according to a length of the drag, regardless of a restriction condition of a social network service for sharing the video data. More specifically, if the image related to the video data is dragged, a summary of the video data is generated. In this case, a play time of the summary may be increased according to a length of the drag.

In this embodiment, a reference to generate a summary of video data may be variable according to a type of an input applied to an image related to the video data. With such a configuration, a user's selection range may be increased.

The reference to generate a summary of video data may be variable as a restriction condition of a social network service or a specific application for sharing the video data. The controller may detect a restriction condition of a social network service or a specific application for sharing the video data, and may compare the detected restriction condition with a preset restriction condition. The controller may output a notification indicating that the restriction condition has changed, and may summarize the video data based on the changed restriction condition.

The present invention may have the following advantages.

Firstly, as a restriction condition of a social network service or a specific application is detected, a different summary corresponding to each social network service or specific application may be generated.

Further, as multimedia data is automatically summarized when the multimedia data is uploaded, a user's convenience may be enhanced.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
    a memory capable of storing video data;
    a touch screen capable of receiving a touch input related to the video data; and
    a controller capable of:
        reducing a play time or a capacity of the video data based on a preset reference such that a summary of the video data is generated based on the touch input, wherein the preset reference is established such that the reduced play time or capacity is less than a play time or a capacity according to a restriction condition of a social network service or an application for sharing the video data; and
        increasing or decreasing the preset reference based on a drag input received via the touch screen at an image related to the video data such that the preset reference is increased when the drag input is received in a first direction and decreased when the drag input is received in a second direction that is an opposite direction of the first direction,
    wherein an increment or decrement of the preset reference is determined based on a length of the drag input such that the increment or decrement corresponds to a difference between the restriction condition and the preset reference.

2. The mobile terminal of claim 1, wherein the controller extracts intra-coded frames from the video data at preset time intervals, and generates the summary of the video data based on the extracted frames.

3. The mobile terminal of claim 2, wherein the controller analyzes images of the extracted frames, and sets an interest region included in the summary of the video data based on a result of the analysis.

4. The mobile terminal of claim 2, wherein the controller detects information related to a person's face from images of the extracted frames, and generates the summary of the video data based on the detected information.

5. The mobile terminal of claim 1, wherein the image related to the video data is output to the touch screen, and
    wherein the controller executes a function related to play of the video data in response to a first touch input applied to the image, and executes a function related to summarization of the video data in response to a second touch input that is different from the first touch input.

6. The mobile terminal of claim 5, wherein the preset reference is variable according to a type of the second touch input.

7. The mobile terminal of claim 1, wherein the controller executes a function to receive a user's input for selecting the video data together with other video data.

8. The mobile terminal of claim 7, wherein the controller generates a single summary using the video data and said other video data.

9. The mobile terminal of claim 1, wherein the controller generates a plurality of summaries of the video data.

10. The mobile terminal of claim 9, wherein the plurality of summaries are sequentially transmitted to the social network service.

11. The mobile terminal of claim 9, wherein upon reception of the plurality of summaries from the social network service, the plurality of summaries are integrated into a single video.

12. The mobile terminal of claim 1, wherein upon selection of a social network service for sharing the video data, the controller detects a restriction condition of the selected social network service in order to establish the preset reference.

13. The mobile terminal of claim 12, wherein the controller extracts information from the video data, and determines whether the video data satisfies the restriction condition based on the information.

14. The mobile terminal of claim 13, wherein when the video data does not satisfy the restriction condition, a selection window for a user's selection for summarization of the video data is output to the touch screen.

15. The mobile terminal of claim 1, wherein when the summary is generated by reducing the play time or capacity of the video data based on the preset reference, the generated summary is transmitted to the social network service.

16. The mobile terminal of claim 15, wherein information related to the summary is transmitted to the social network service when the generated summary is transmitted to the social network service.

17. The mobile terminal of claim 1, wherein information related to the summary is recorded in the video data, or information related to the video data is recorded in the summary.

18. The mobile terminal of claim 1, wherein the controller recommends an application or a social network service suitable for the summary.

19. The mobile terminal of claim 18, wherein icons for selecting the recommended application or social network service are output to the touch screen, in an overlapped manner with an image of the summary.

20. A mobile terminal, comprising:
a memory capable of storing video data;
a touch screen capable of outputting an image related to the video data, and receiving a touch input applied to the image; and
a controller capable of:
generating a summary of the video data based on a preset reference in response to the touch input, the video data edited in response to the touch input such that the edited video data with a reduced play time or a reduced capacity is included in the summary of the video data, wherein the reduced playtime or capacity of the edited video data is less than a play time or a capacity according to a restriction condition of a social network service or an application for sharing the video data; and
increasing or decreasing the preset reference based on a drag input received via the touch screen at the image related to the video data such that the preset reference is increased when the drag input is received in a first direction and decreased when the drag input is received in a second direction that is an opposite direction of the first direction,
wherein an increment or decrement of the preset reference is determined based on a length of the drag input such that the increment or decrement corresponds to a difference between the restriction condition and the preset reference.

* * * * *